(12) United States Patent
Desai

(10) Patent No.: US 8,961,792 B2
(45) Date of Patent: Feb. 24, 2015

(54) DUPLEX STRAINER APPARATUSES AND METHODS

(75) Inventor: Ashvin D. Desai, Lumberton, NC (US)

(73) Assignee: Titan Flow Control, Inc., Lumberton, NC (US)

( * ) Notice: Subject to any disclaimer, the term of this patent is extended or adjusted under 35 U.S.C. 154(b) by 159 days.

(21) Appl. No.: 13/151,838

(22) Filed: Jun. 2, 2011

(65) Prior Publication Data

US 2012/0000835 A1 Jan. 5, 2012

Related U.S. Application Data

(60) Provisional application No. 61/351,140, filed on Jun. 3, 2010.

(51) Int. Cl.
*B01D 35/12* (2006.01)
*B01D 29/50* (2006.01)
*B01D 29/88* (2006.01)

(52) U.S. Cl.
CPC ..................................... *B01D 35/12* (2013.01)
USPC ........ 210/340; 210/234; 210/254; 210/323.1; 210/418

(58) Field of Classification Search
None
See application file for complete search history.

(56) References Cited

U.S. PATENT DOCUMENTS

| 678,001 | A | * | 7/1901 | Merrill | 210/341 |
|---|---|---|---|---|---|
| 1,408,822 | A | * | 3/1922 | Mosher | 210/341 |
| 1,625,024 | A | * | 4/1927 | Hall | 210/341 |
| 2,921,687 | A | * | 1/1960 | Jenkins | 210/341 |
| 3,572,507 | A | * | 3/1971 | Juskevic | 210/97 |
| 4,496,463 | A | | 1/1985 | Desai et al. | |
| 5,443,722 | A | | 8/1995 | Desai et al. | |
| 5,813,706 | A | * | 9/1998 | Travis | 285/363 |
| 7,442,220 | B2 | * | 10/2008 | Pearson et al. | 55/418 |

FOREIGN PATENT DOCUMENTS

| CA | 1214115 | 11/1986 |
|---|---|---|
| CN | 101060905 | 10/2007 |
| EP | 1 098 119 | 5/2001 |
| EP | 1 316 347 | 6/2003 |

OTHER PUBLICATIONS

Canadian Office Action for Application No. 2 741 950 dated Jul. 24, 2013.

(Continued)

*Primary Examiner* — Benjamin Kurtz
(74) *Attorney, Agent, or Firm* — Jenkins, Wilson, Taylor & Hunt, P.A.

(57) ABSTRACT

A fluid strainer is disclosed for use in a fluid piping system, the fluid strainer having a first valve chamber and a second valve chamber. The first valve chamber can have a strainer inlet and contain first and second angled members, and the second valve chamber can have a strainer outlet and contain third and fourth angled members. A first pivotable seal can be movable within the first valve chamber into sealing engagement against either of the first or second angled members, and a second pivotable seal can be movable within the second valve chamber into sealing engagement against either of the third or fourth angled members. A first strainer chamber can be in communication with the first angled member and the third angled member, and a second strainer chamber can be in communication with the second angled member and the fourth angled member.

18 Claims, 10 Drawing Sheets

(56) References Cited

OTHER PUBLICATIONS

Chinese Office Action and Search Report for Application No. 201110201006.1 dated Aug. 15, 2013.

Chinese Office Action for Application No. 201110201006.1 dated Apr. 25, 2014.

Canadian Office Action for Application No. 2,741,950 dated May 15, 2014.

* cited by examiner

DUPLEX STRAINER APPARATUSES AND METHODS

RELATED APPLICATION

The presently disclosed subject matter claims the benefit of U.S. Patent Application Ser. No. 61/351,140, filed Jun. 3, 2010, the disclosure of which is incorporated herein by reference in its entirety.

TECHNICAL FIELD

The subject matter disclosed herein relates generally to a fluid strainer such as for use in a fluid piping system. More particularly, the subject matter disclosed herein relates to a duplex strainer providing multiple straining flow paths.

BACKGROUND

In many fluid flow applications, it is often necessary that the flow from an upstream source be cleaned or strained before use in downstream components. In this regard, strainers are used to protect such downstream equipment by mechanically removing solids from flowing fluids via a straining element, such as a perforated, mesh, or wedge-wire straining element. Although many designs and configurations of strainers exist, duplex strainers provide an added advantage over other straining systems by permitting continuous straining and cleaning of a flow. Specifically, duplex strainers generally include two strainer chambers and some type of mechanism for diverting the flow from one chamber to the other to isolate the flow to a single chamber. This arrangement permits cleaning, servicing, or repairing of one chamber while the other one is in use, thereby enabling the flow through the duplex strainer to remain substantially continuous.

A number of different designs for duplex strainers have been used, with varying valve designs (e.g., scotch yokes, ball valves) for switching the flow between strainers, but each design both has advantages over other options and suffers from one or more problems, such as number and complexity of components, space requirements, effectiveness in flow isolation, and/or ease of operation. Accordingly, it would be desirable for a duplex strainer design to effectively control the flow between and among multiple strainer assemblies while minimizing the problems found in prior art designs.

SUMMARY

In accordance with this disclosure, apparatuses for fluid straining for use in a fluid piping system are provided. In one aspect, a fluid strainer is provided. The fluid strainer can comprise a housing comprising a first valve chamber comprising a strainer inlet and a second valve chamber comprising a strainer outlet. First and second angled members can each comprise a first end in communication with the first valve chamber and a second end, and third and fourth angled members can each comprise a first end in communication with the second valve chamber and a second end. A first pivotable seal can be movable within the first valve chamber into sealing engagement against the first end of either of the first or second angled members, and a second pivotable seal can be movable within the second valve chamber into sealing engagement against the first end of either of the third or fourth angled members. A first strainer chamber can comprise a first strainer inlet in communication with the second end of the first angled member and a first strainer outlet in communication with the second end of the third angled member. Similarly, a second strainer chamber can comprise a second strainer inlet in communication with the second end of the second angled member and a second strainer outlet in communication with the second end of the fourth angled member.

Although an aspect of the subject matter disclosed herein has been stated hereinabove, and which is achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

Figure 1:
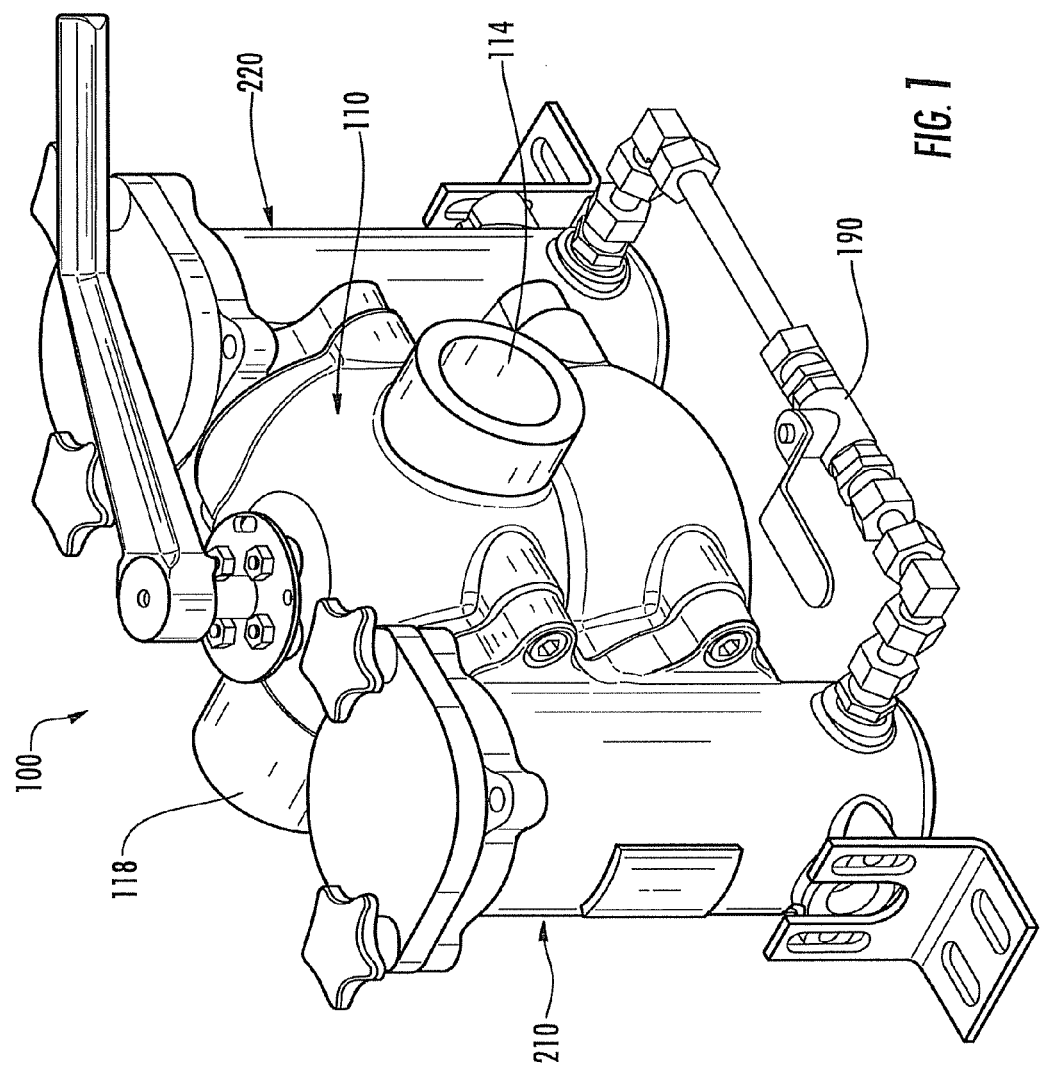
FIG. 1 is a perspective view of a fluid strainer according to an embodiment of the presently disclosed subject matter.
Figure 2:
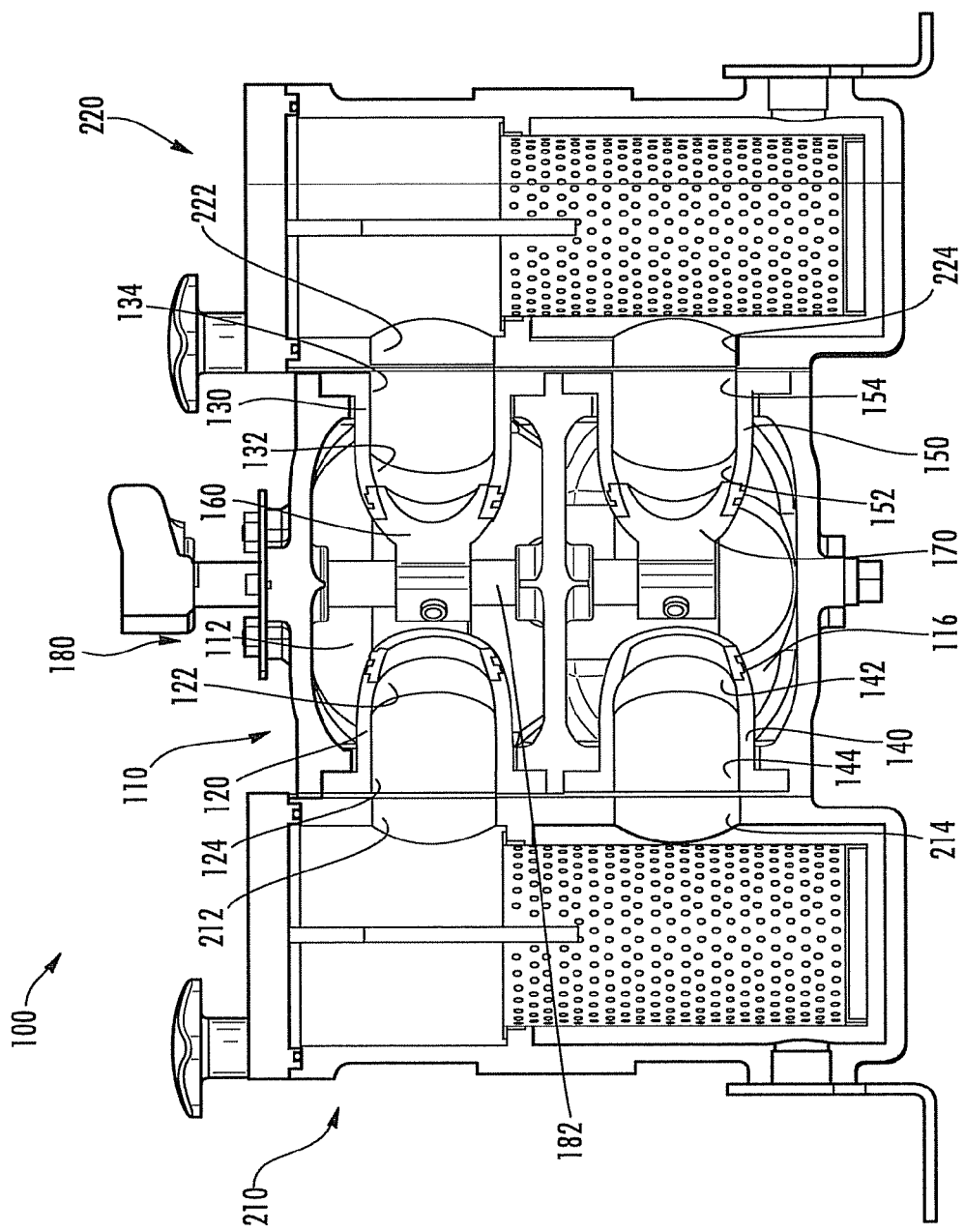
FIG. 2 is a cutaway side view of the fluid strainer according to an embodiment of the presently disclosed subject matter.

The present subject matter provides apparatuses or devices for fluid straining for use in a fluid piping system. In one aspect, a fluid strainer generally designated 100 can be provided. As shown in FIGS. 1 and 2, fluid strainer 100 can comprise a housing 110, which can itself comprise a first valve chamber 112 defining a strainer inlet 114 and a second valve chamber 116 defining a strainer outlet 118. Fluid strainer 100 can be installed in-line with a fluid piping system such that fluid is received at strainer inlet 114 and passed to downstream piping out of strainer outlet 118. In this regard, strainer inlet 114 and strainer outlet 118 can comprise features adapted to provide fluid-tight connection to other piping elements. For example, although strainer inlet 114 and strainer outlet 118 are shown in FIG. 1 as having a substantially smooth, cylindrical shape, these elements can comprise a threaded connector, a flanged connector (e.g., a split flange), or any of a variety of other configurations designed to enable connection to other piping elements.

In addition, strainer 100 can further include a first strainer chamber 210 and a second strainer chamber 220, each in communication with both of first valve chamber 112 and second valve chamber 116. In this configuration, fluid received by first valve chamber 112 through strainer inlet 114 can be passed to either or both of first strainer chamber 210 or second strainer chamber 220. Entrained solids or other undesirable materials can be removed from the fluid within first or second strainer chambers 210 or 220. The fluid can be passed from the strainer chambers to second valve chamber 116, and the fluid can be discharged from second valve chamber 116 through strainer outlet 118.

In addition, one or both of first strainer chamber 210 or second strainer chamber 220 can be detachable from housing 110, which can allow easy access on either side for maintenance, cleaning, or the like. This detachability can also enable the end-user to customize the design of strainer 100 by swapping either or both of first strainer chamber 210 or second strainer chamber 220 with chambers having different basket designs or sizes. Further, if only one of first strainer chamber 210 or second strainer chamber 220 is detached, operation of strainer 100 can be continued using the other.

Regarding the particular design of fluid strainer 100, FIG. 2 shows a cutaway side view of fluid strainer 100. As shown in FIG. 2, a first angled member 120 and a second angled member 130 can be positioned within first valve chamber 112 to define flow paths for fluid flowing into first valve chamber 112. Specifically, first angled member 120 can comprise a first end 122 in communication with first valve chamber 120 and a second end 124 for directing fluid away from first valve chamber (e.g., towards first strainer chamber 210). Second angled member 130 can likewise comprise a first end 132 in communication with first valve chamber 112 and a second end 134 for directing fluid away from first valve chamber (e.g., towards second strainer chamber 220). In particular, for example, first strainer chamber 210 can comprise a first strainer inlet 212 in communication with second end 124 of first angled member 120, whereas second strainer chamber 220 can comprise a second strainer inlet 222 in communication with second end 134 of second angled member 130. In this arrangement, fluid received by first valve chamber 112 through strainer inlet 114 can be directed through either or both of first ends 122 or 132 of first and second angled members 120 and 130, respectively, for directing fluid to one or both of first or second strainer chambers 210 or 220.

Similarly, a third angled member 140 and a fourth angled member 150 can be positioned within second valve chamber 116 to define flow paths within second valve chamber 116. Specifically, third angled member 140 can comprise a first end 142 in communication with second valve chamber 116 and a second end 144 for directing fluid into second valve chamber 116 (e.g., from first strainer chamber 210). Fourth angled member 150 can likewise comprise a first end 152 in communication with second valve chamber 116 and a second end 154 for directing fluid into second valve chamber 116 (e.g., from second strainer chamber 220). In particular, for example, first strainer chamber 210 can comprise a first strainer outlet 214 in communication with second end 144 of third angled member 140, and second strainer chamber 220 can comprise a second strainer outlet 224 in communication with second end 154 of fourth angled member 150. In this arrangement, fluid from either or both of first or second strainer chambers 210 or 220 can be directed to second valve chamber 116 through second ends 144 or 154 of third and fourth angled members 140 and 150, respectively, for directing fluid to second valve chamber 116 and out of fluid strainer 100 through strainer outlet 118.

Figure 3:
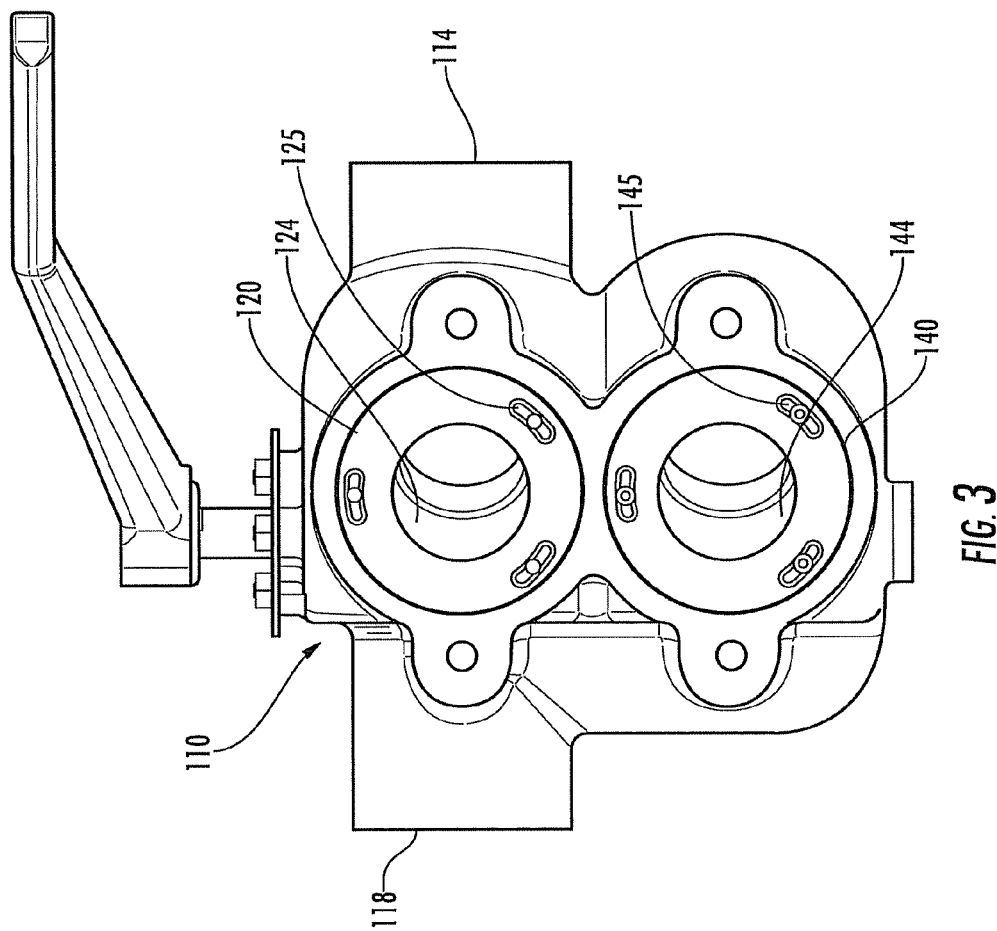
FIG. 3 is a side view of a strainer housing of the fluid strainer according to an embodiment of the presently disclosed subject matter.

Referring to FIG. 3, a side view of housing 110 can be seen with first strainer chamber 210 being removed. As shown in FIG. 3, each of the angled members can be positioned in respective chambers of housing 110 such that their second ends occupy an opening in housing 110 and are directed towards an exterior edge of housing 110. For instance, second end 124 of first angled member 120 and second end 144 of third angled member 140 can each be oriented in openings facing out of housing 110 toward first strainer chamber 210. Likewise, although not shown in the figures, it should be understood that second end 134 of second angled member 130 and second end 154 of fourth angled member 150 can be oriented to face out of housing 110 toward second strainer chamber 220.

The angled members can be formed integrally with housing 110 or they can be detachable elements that are secured in place to housing 110. Where the angled members are separate elements, the specific orientation of the angled members within housing 110 can be precisely adjusted. For instance, first angled member 120 can comprise one or more first adjustable connectors 125 for securing first angled member 120 in housing 110. Specifically, as shown in FIG. 3, each of first adjustable connectors 125 can be an arcuate slot through which a fastener can be inserted for fixation to housing 110. The arcuate slot can be designed so that first end 122 of first angled member 120 can be rotated or otherwise adjusted as needed within first valve chamber 112. For example, FIG. 3 shows a configuration in which three of first adjustable connectors 125 are provided for securing first angled member 120 in housing 110, which can help to ensure that first angled member 120 is installed in a preferred orientation. It should be understood, however, that any of a variety of configurations having a different number of first adjustable connectors 125 (e.g., one, two, four) can be used depending on the preferences of the end-user. Likewise, third angled member 140 can comprise one or more third adjustable connectors 145 for adjusting the orientation of third angled member 140 in housing 110. Similarly, although not shown in FIG. 3, the orientations of second angled member 130 and fourth angled member 150 can also be adjusted using second and fourth adjustable connectors 135 and 155, respectively. Such adjustability can enable the user to precisely position the angled members to cooperate with sealing elements (discussed below) to optimize the sealing capacity of the system.

Within housing 110, fluid strainer 100 can comprise a movable flow control system 180 to direct the flow of fluid to either or both of first strainer chamber 210 or second strainer chamber 220. Specifically, for example, flow control system 180 can comprise a first pivotable seal 160 movable within first valve chamber 112 into sealing engagement against either of first end 122 of first angled member 120 or first end 132 of second angled member 130. Similarly, a second pivotable seal 170 can be movable within second valve chamber 116 into sealing engagement against either of first end 142 of third angled member 140 or first end 152 of fourth angled member 150.

Figure 4:
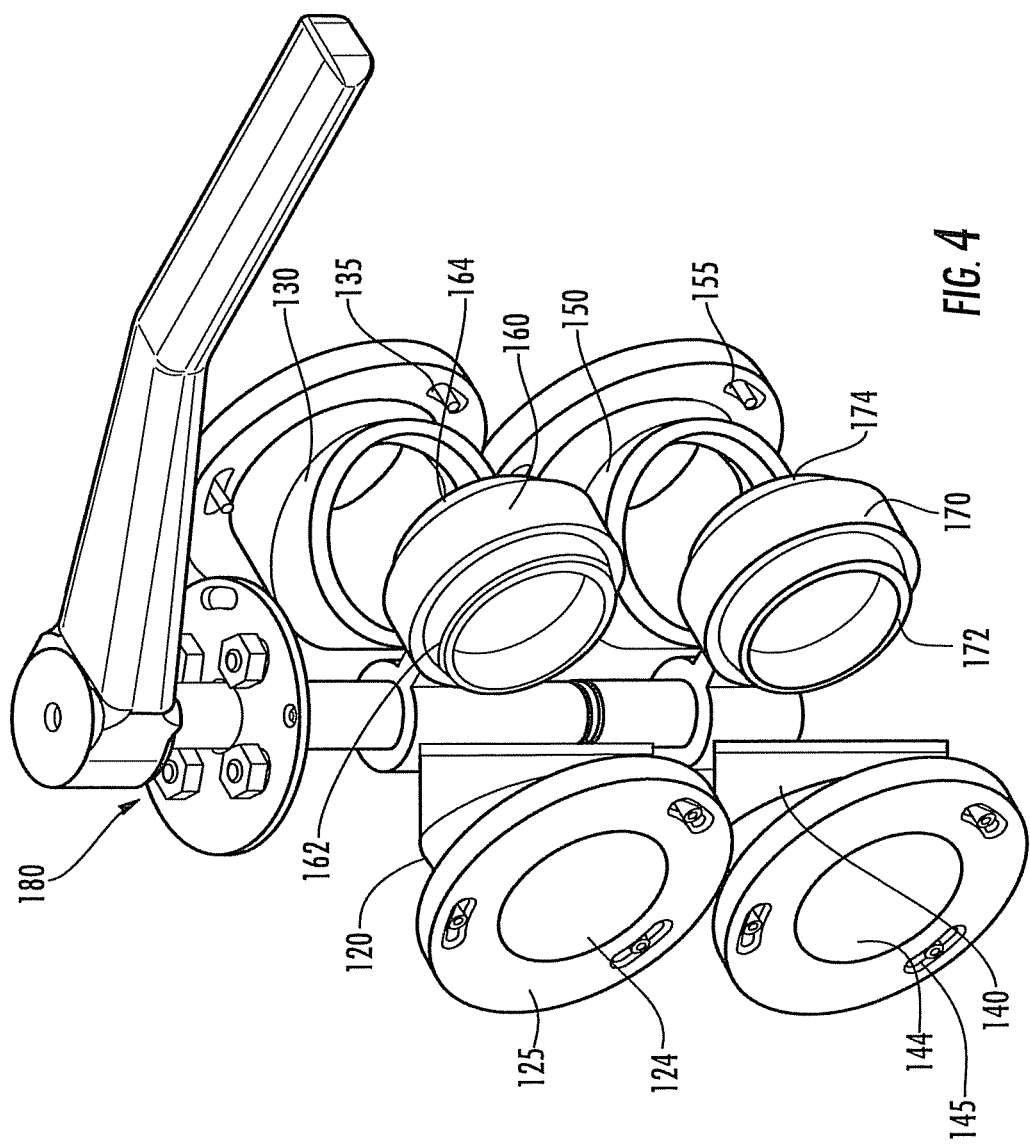
FIG. 4 is a perspective view of a valve assembly for use in the fluid strainer according to an embodiment of the presently disclosed subject matter.

FIG. 4 depicts components of an exemplary flow control system 180 that can be housed within housing 110. As shown in FIG. 4, both first pivotable seal 160 and second pivotable seal 170 can be connected to flow control system 180 via a coupling rod 182. Referring to FIG. 2, it can be seen that coupling rod 182 can comprise a pivotable rod extending through both first valve chamber 112 and second valve chamber 116. In this arrangement, rotation of coupling rod 182 can cause rotation of both of first pivotable seal 160 and second pivotable seal 170 in unison. Sealing elements (e.g., one or more O-ring or "V"-ring seals) can be positioned at the interfaces between coupling rod 182 and housing 110 can help to prevent cross-contamination between first valve chamber 112 and second valve chamber 116 and increase the service life of strainer 100.

For example, flow control system 180 can be operated to move to a first sealing position in which first pivotable seal 160 into sealing engagement against second angled member 130 at the same time that second pivotable seal 170 is moved into sealing engagement against fourth angled member 150. In this arrangement, fluid entering first valve chamber 112 through strainer inlet 114 can be routed through first angled member 120, first strainer chamber 210, and third angled member 140 into second valve chamber 116, where it can be discharged from strainer outlet 118. Alternatively, flow control system 180 can be operated to move to a second sealing position in which first pivotable seal 160 is in sealing engagement against first angled member 120 at the same time that second pivotable seal 170 is in sealing engagement against third angled member 140. In this arrangement, fluid entering first valve chamber 112 through strainer inlet 114 can be routed through second angled member 130, second strainer chamber 220, and fourth angled member 150 into second valve chamber 116, where it can be discharged from strainer outlet 118.

Further, the internal components of fluid strainer 100, shown in FIG. 4 for example, can be specifically designed to improve the functionality of the system by limiting the amount flow control system 180 needs to be operated to move the pivotable seals between the first sealing position and the second sealing position. Specifically, for example, one or more of first, second, third, and fourth angled members 120, 130, 140, and 150 can be comprise 45° elbows as shown in FIG. 4. First and second angled members 120 and 130 can be positioned such that first end 122 of first angled member 120 forms close to or around a 90° angle with respect to first end 132 of second angled member 130. Similarly, third and fourth angled members 140 and 150 can be positioned with first end 142 of third angled member 140 forming at or around a 90° angle with respect to first end 152 of fourth angled member 150. In this configuration, flow control system need only be rotated about 90° (i.e., a quarter turn) to transition from one sealing position to the other, which can allow strainer 100 to be readily integrated into an automated system.

The operation of fluid strainer 100 can further be improved by strengthening the seal created by first pivotable seal 160 and second pivotable seal 170 with respective angled members to be effectively "bubble-tight". For instance, one way to improve the seal between these components can be to provide a sealing element at the respective first ends of one or more of first, second, third, and/or fourth angled members 120, 130, 140, and 150, examples of which are shown in FIGS. 5 through 9. For example, first angled member 120 can have a first sealing element 126 positioned at its first end 122 and shaped to receive first pivotable seal 160. First sealing element 126 can be provided in any of a variety of forms known in the art.

Figure 5:
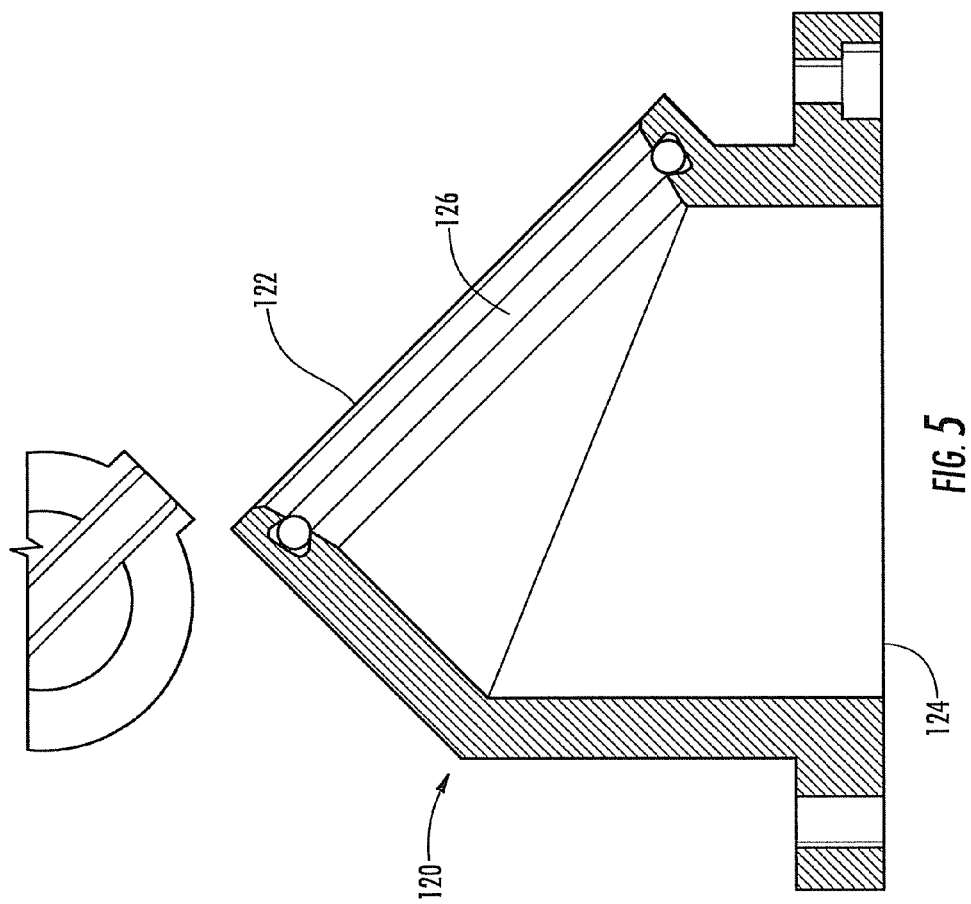
FIG. 5 is a cutaway top view of an angled member of the fluid strainer according to an embodiment of the presently disclosed subject matter.
Figure 6:
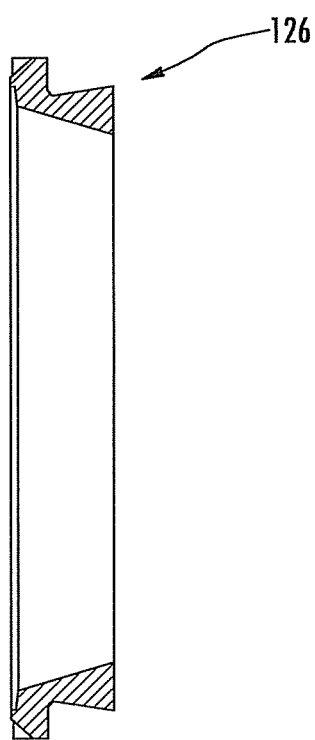
FIG. 6 is a cutaway side view of a seal for use in the fluid strainer according to an embodiment of the presently disclosed subject matter.
Figure 7:
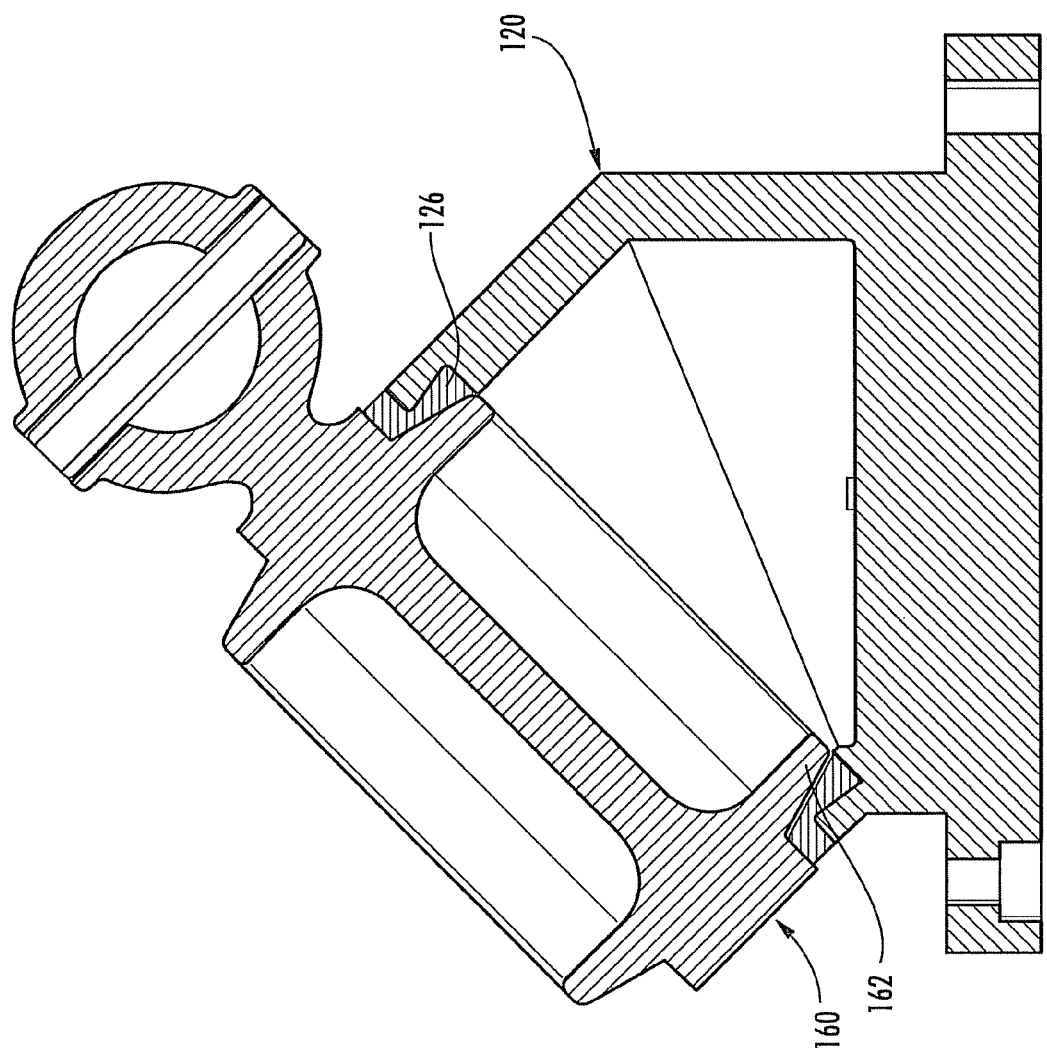
FIG. 7 is a cutaway top view of an angled member and a pivotable seal for use in the fluid strainer according to an embodiment of the presently disclosed subject matter.

Referring to FIG. 5, first sealing element 126 can be an O-ring formed from an elastomeric material (e.g., rubber), which can be positioned in a groove at or about first end 122 of first sealing element 126. Such an O-ring can be a standard size that is widely commercially available. Alternatively, referring to FIGS. 6 and 7, first sealing element 126 can be configured to have a design that provides self-alignment of first pivotable seal 160 with first end 122 of first angled member 120. Specifically, for example, first pivotable seal 160 can comprise a first frustoconical projection 162 extending towards first angled member 120, and first sealing element 126 can comprise a substantially cup-shaped sealing surface that is adapted to receive first frustoconical projection 162 of first pivotable seal 160. In this configuration, first frustoconical projection 162 can be moved quickly and easily into sealing engagement with first sealing element 126. (See, e.g., FIG. 7) In addition, first pivotable seal 160 and first sealing element 126 can be configured such that when flow control system 180 is moved to the second sealing position (i.e., positioned for flow through second strainer chamber 220), a force holding first pivotable seal 160 against first sealing element 126 increases with increased fluid pressure.

Figure 8:
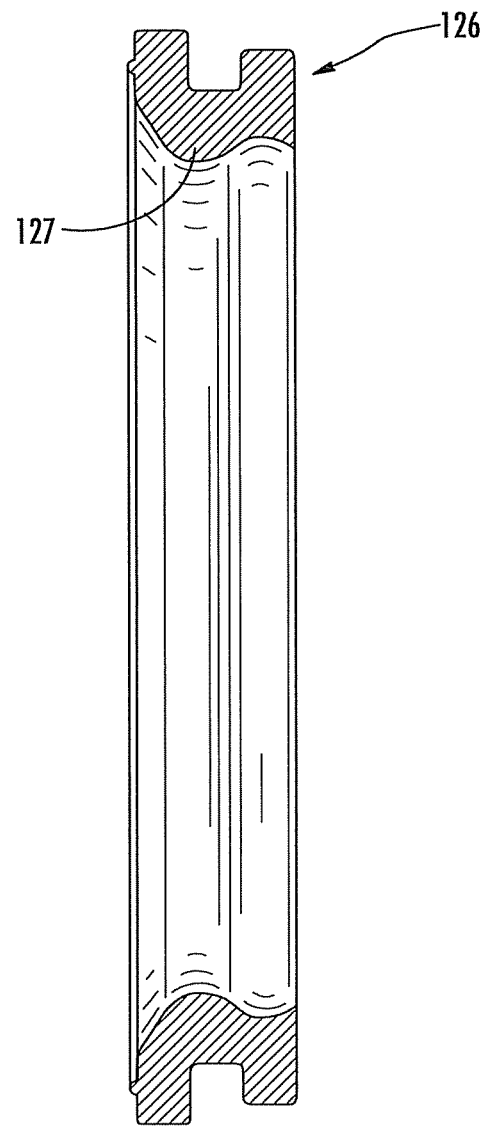
FIG. 8 is a cutaway side view of a seal for use in the fluid strainer according to an embodiment of the presently disclosed subject matter.
Figure 9:
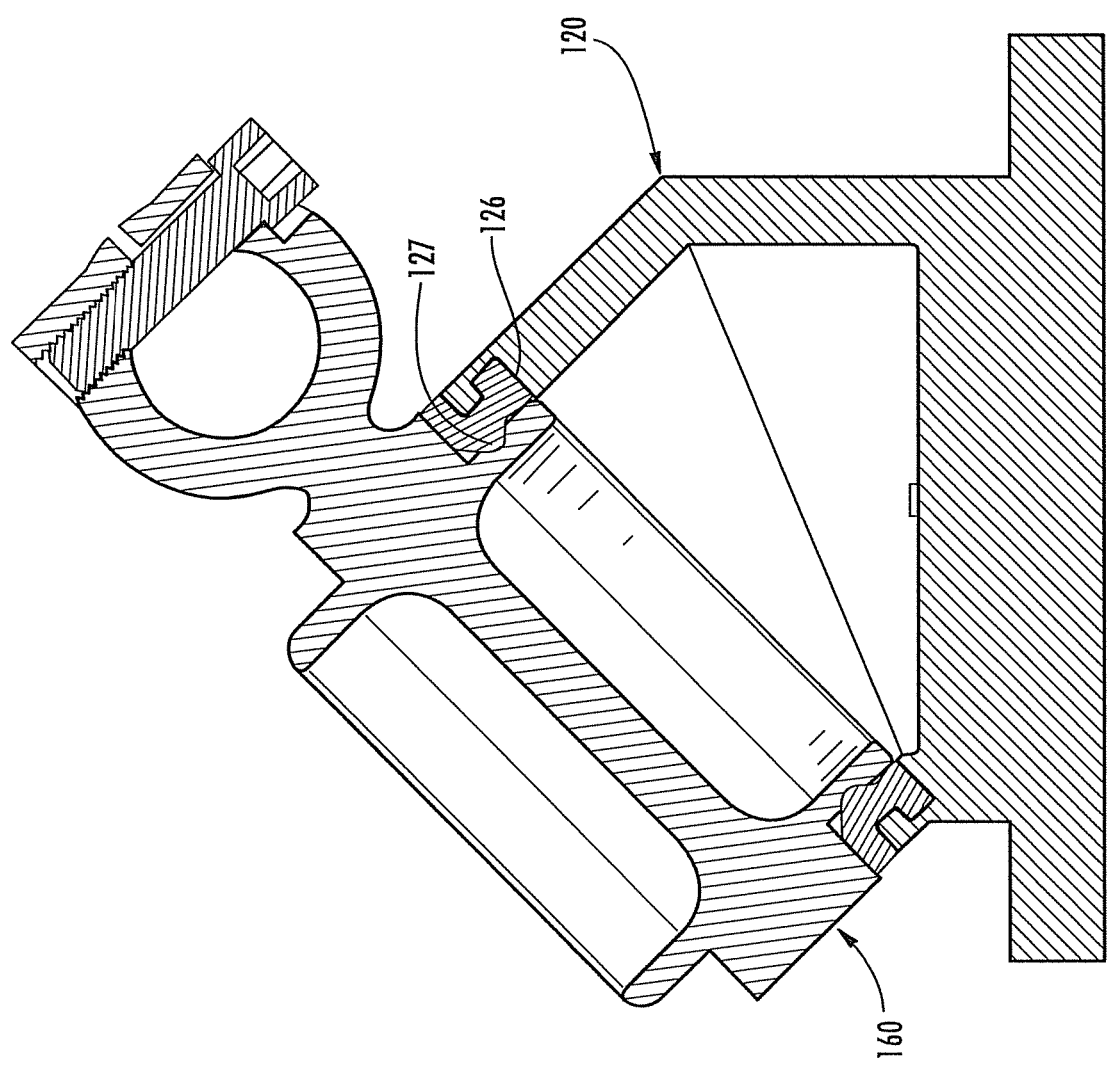
FIG. 9 is a cutaway top view of an angled member and a pivotable seal for use in the fluid strainer according to an embodiment of the presently disclosed subject matter.

In yet a further alternative shown in FIGS. 8 and 9, first sealing element 126 can be configured to have a contoured surface designed to engage a surface of first pivotable seal 160. Specifically, for example, FIG. 8 shows that first sealing element 126 can comprise a first retaining lip 127 that bulges inwardly relative to the surrounding portion of first sealing element 126 towards a center of the flow path through first angled member 120. In this configuration, the operator can push a portion of first pivotable seal 160 past first retaining lip 127 to the position shown in FIG. 9, wherein first retaining lip 127 grips onto first pivotable seal 160 to help maintain first pivotable seal 160 in a seated position against first sealing element 126. In this configuration, the design of first sealing element 126 can help to prevent inadvertent disengagement of the components, thereby providing a stronger seal than a standard surface contact seal.

Although reference is made in FIGS. 5 through 9 and in the discussion above to the interaction of first pivotable seal 160 and a first sealing element 126, it is to be understood that similar sealing elements can be provided on second, third, and fourth angled members 130, 140, and 150. Similarly, first pivotable seal 160 can further comprise a second frustoconical projection 164 for sealing engagement at first end 132 of second angled member 130, and second pivotable seal 170 can likewise comprise a first frustoconical projection 172 and a second frustoconical projection 174 for sealing engagement at first ends 142 and 152 of third and fourth angled members 140 and 150, respectively. In addition, those of skill in the art will understand that the exemplary sealing elements disclosed above describe only a few of the many options available for strengthening the seal between respective angled members and pivotable seals, such as gaskets, coatings, or the like.

A number of additional features can further improve the operation of fluid strainer 100. First, a pressure equalization line 190 can be connected between first strainer chamber 210 and second strainer chamber 220 for improving service life of seals within fluid strainer 100 and minimizing operating torque (e.g., no lifting jack needed). Specifically, for instance, when flow control system 180 is moved to the second sealing position (i.e., positioned for flow through second strainer chamber 220), fluid pressure in the system can tend to maintain flow control system 180 in the second sealing position. In other words, system pressure can act to force first pivotable seal 160 and second pivotable seal 170 against first angled member 120 and third angled member 140, respectively, making it difficult to move flow control system 180 to the first sealing position or to a neutral position in between the first and second sealing positions. To alleviate this problem, pressure equalization line 190 can be operated to reduce or eliminate the pressure differential between the active fluid pathway (e.g., first valve chamber 112, second strainer chamber 220, and second valve chamber 116) and first strainer chamber 210, thereby requiring less force to operate flow control system 180.

Figure 10:
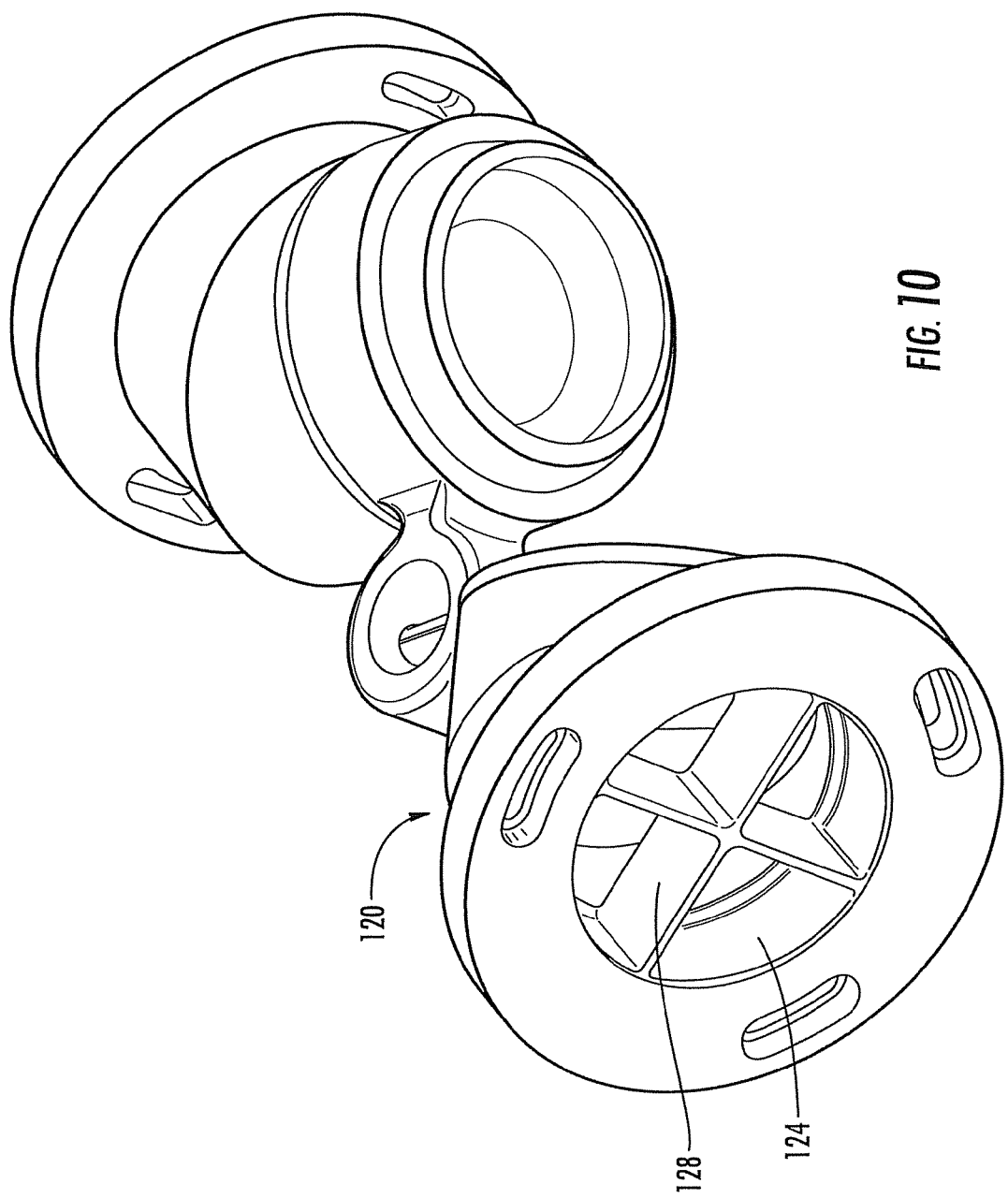
FIG. 10 is a perspective view of an angled member of the fluid strainer according to an embodiment of the presently disclosed subject matter.

Another feature that can be advantageously included in fluid strainer 100 is a flow-smoothing mechanism to reduce turbulence within the fluid pathways of fluid strainer 100. Specifically, fluid strainer 100 can comprise a plurality of flow routing vanes at least partially traversing one or more of first strainer inlet 212, second strainer inlet 222, first strainer outlet 214, or second strainer outlet 224. For example, as shown in FIG. 10, first angled member 120 can comprise a plurality of flow routing vanes 128 positioned across second end 124. In this arrangement, flow routing vanes 128 can reduce turbulence in the fluid flow as it is directed away from first valve chamber 112 and towards first strainer chamber 210. Alternatively, flow routing vanes 128 can be positioned on first strainer chamber 210 across first strainer inlet 212 rather than on first angled member 120. In either arrangement, flow routing vanes 128 can be configured to alter incoming turbulent flow between first valve chamber 112 and first strainer chamber 210 to become smoother, thereby reducing pressure drop, noise, erosion, corrosion, vibration, and/or cavitations. In addition, those having skill in the art will recognize that similar flow-smoothing mechanisms, such as flow routing vanes 128 discussed above, can likewise be positioned at or near one or more of second strainer inlet 222, first strainer outlet 214, or second strainer outlet 224.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A fluid strainer comprising:
   a housing comprising a first valve chamber comprising a strainer inlet and a second valve chamber comprising a strainer outlet;
   first and second angled members positioned within the first valve chamber, each comprising a first end in communication with the first valve chamber and a second end aligned at a non-zero angle with respect to the first end;
   third and fourth angled members positioned within the second valve chamber, each comprising a first end in communication with the second valve chamber and a second end aligned at a non-zero angle with respect to the first end;
   a first pivotable seal movable within the first valve chamber into sealing engagement against the first end of either of the first or second angled members;
   a second pivotable seal movable within the second valve chamber into sealing engagement against the first end of either of the third or fourth angled members;
   a first strainer chamber comprising a first strainer chamber inlet in communication with the second end of the first angled member and a first strainer chamber outlet in communication with the second end of the third angled member;
   a second strainer chamber comprising a second strainer chamber inlet in communication with the second end of the second angled member and a second strainer chamber outlet in communication with the second end of the fourth angled member; and
   adjustable connectors disposed on the second ends of one or more of the first, second, third, or fourth angled members for securing the angled members to the respective strainer chambers, wherein the one or more angled members comprising the adjustable connectors are adjustably mounted within the housing such that the position of the first sides of the one or more angled members is movable for adjustable alignment within the first or second valve chamber;
   wherein both the first strainer chamber and the second strainer chamber are selectively detachable from the housing.

2. The fluid strainer of claim 1, wherein the first, second, third, and fourth angled members comprise approximately at least 45° elbows.

3. The fluid strainer of claim 2, wherein the first and second angled members are positioned with the first end of the first angled member forming a 90° angle with respect to the first end of the second angled member; and
   wherein the third and fourth angled members are positioned with the first end of the third angled member forming a 90° angle with respect to the first end of the fourth angled member.

4. The fluid strainer of claim 1, comprising a coupling rod connected to both the first pivotable seal and the second pivotable seal and adapted for rotating the first pivotable seal and the second pivotable seal in unison.

5. The fluid strainer of claim 4, wherein the coupling rod comprises a pivotable rod extending through the first valve chamber and the second valve chamber.

6. The fluid strainer of claim 1, comprising a pressure equalization line connected between the first strainer chamber and the second strainer chamber for improving service life of seals within the fluid strainer and minimizing operating torque.

7. The fluid strainer of claim 1, comprising a plurality of flow routing vanes at least partially traversing one or more of the first strainer chamber inlet, the second strainer chamber inlet, the first strainer chamber outlet, or the second strainer chamber outlet.

8. The fluid strainer of claim 7, wherein the plurality of flow routing vanes are configured to alter incoming turbulent flow to become smoother, thereby reducing pressure drop, noise, erosion, corrosion, vibration, and/or cavitations.

9. The fluid strainer of claim 1, comprising a sealing element at the first end of each of the first, second, third, and fourth angled members, the sealing elements each being shaped to receive the respective pivotable seal.

10. The fluid strainer of claim 9, wherein the sealing elements are configured to provide self alignment of the pivotable seals with the first ends of the angled members.

11. The fluid strainer of claim 9, wherein the first pivotable seal comprises a frustoconical projection extending towards each of the first and second angled members and the second pivotable seal comprises a frustoconical projection extending towards each of the third and fourth angled members; and
    wherein the sealing elements each comprise a substantially cup-shaped sealing surface shaped to receive the frustoconical projection of the respective pivotable seal.

12. The fluid strainer of claim 11, wherein the pivotable seals and the sealing elements are configured such that a force holding the respective pivotable seal against the sealing element increases with increased fluid pressure.

13. The fluid strainer of claim 9, wherein each sealing element comprises a first retaining lip extending towards the respective pivotable seal and configured to grip onto the respective pivotable seal when it is received by the sealing element.

14. The fluid strainer of claim 1, wherein the strainer inlet is positioned on a first side of the housing; and wherein the strainer outlet is positioned on a second side of the housing, the second side substantially opposing the first side.

15. The fluid strainer of claim 1, wherein the first strainer chamber inlet and the first strainer chamber outlet are positioned on a first side of the housing; and wherein the second strainer chamber inlet and the second strainer chamber outlet are positioned on a second side of the housing, the second side substantially opposing the first side.

16. A fluid strainer comprising:

a housing, the housing comprising a first valve chamber comprising a strainer inlet and a second valve chamber comprising a strainer outlet;

a first strainer chamber having an outer surface, at least a portion of the outer surface being in contact with a first side of the housing such that a first strainer chamber inlet is in communication with the first valve chamber and a first strainer chamber outlet is in communication with the second valve chamber;

a second strainer chamber having an outer surface, at least a portion of the outer surface being in contact with a first side of the housing such that a second strainer chamber inlet is in communication with the first valve chamber and a second strainer chamber outlet is in communication with the second valve chamber; and a movable flow control system positioned within the housing and configured to direct a flow of fluid to either or both of the first strainer chamber or the second strainer chamber, the movable flow control system comprising angled members with adjustable connectors such that a position of the angled members is movable for adjustable alignment within the first or second valve chamber;

wherein both the first strainer chamber and the second strainer chamber are selectively detachable from the housing.

17. The fluid strainer of claim 1, wherein the adjustable connectors comprise an arcuate slot through which a fastener can be inserted for adjustable fixation.

18. The fluid strainer of claim 16, wherein the adjustable connectors comprise an arcuate slot through which a fastener can be inserted for adjustable fixation.

* * * * *